United States Patent
Dennard et al.

(10) Patent No.: US 8,636,209 B2
(45) Date of Patent: Jan. 28, 2014

(54) SYSTEM AND METHOD FOR INTERACTIVE MARKETING TO CONSUMERS

(75) Inventors: Mark D. Dennard, Decatur, GA (US); Mark J. S. Schunzel, Poughkeepsie, NY (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 13/551,006

(22) Filed: Jul. 17, 2012

(65) Prior Publication Data
US 2013/0013452 A1 Jan. 10, 2013

Related U.S. Application Data

(63) Continuation of application No. 11/695,938, filed on Apr. 3, 2007, now Pat. No. 8,376,226.

(51) Int. Cl.
*G06K 7/00* (2006.01)
(52) U.S. Cl.
USPC ............... 235/383; 235/375; 235/380; 705/5
(58) Field of Classification Search
USPC .......................................... 235/375, 380, 383
See application file for complete search history.

(56) References Cited

U.S. PATENT DOCUMENTS

| | | | |
|---|---|---|---|
| 6,587,835 B1 * | 7/2003 | Treyz et al. | 705/14.64 |
| 7,206,434 B2 | 4/2007 | Overton et al. | |
| 7,558,739 B2 | 7/2009 | Thomson | |
| 2002/0139846 A1 | 10/2002 | Needham et al. | |
| 2004/0036717 A1 | 2/2004 | Kjeldsen et al. | |
| 2004/0078209 A1 | 4/2004 | Thomson | |
| 2004/0103033 A1 | 5/2004 | Reade et al. | |
| 2004/0203633 A1 | 10/2004 | Knauerhase et al. | |
| 2004/0254676 A1 | 12/2004 | Blust et al. | |
| 2005/0044011 A1 | 2/2005 | Deal | |
| 2005/0067492 A1 | 3/2005 | Amitay et al. | |
| 2005/0075145 A1 | 4/2005 | Dvorak et al. | |
| 2005/0206523 A1 | 9/2005 | Engellenner | |
| 2005/0251418 A1 | 11/2005 | Fox et al. | |
| 2005/0256786 A1 | 11/2005 | Sands et al. | |
| 2007/0167170 A1 | 7/2007 | Fitchett et al. | |
| 2007/0168766 A1 | 7/2007 | Le et al. | |
| 2007/0210155 A1 | 9/2007 | Swartz et al. | |
| 2007/0228163 A1 | 10/2007 | Schon et al. | |
| 2007/0262964 A1 | 11/2007 | Zotov et al. | |
| 2009/0059175 A1 | 3/2009 | Le Quesne et al. | |

OTHER PUBLICATIONS

Sukaviriya, et al., "Embedding Interactions in a Retail Store Environment: The Design and Lessons Learned", Ninth IFIP International Conference on Human-Computer Interaction (Interact'03). Zurich, Switzerland. Sep. 2003, 8 pages.

(Continued)

*Primary Examiner* — Michael G Lee
*Assistant Examiner* — Matthew Mikels
(74) *Attorney, Agent, or Firm* — Matthew Chung; Roberts Mlotkowski Safran & Cole, P.C.

(57) ABSTRACT

A system and method for interactive marketing to consumers and, more particularly, to a system and method for marketing merchandise to consumers in an interactive retail environment. The method includes detecting a disturbance in an area and sending information related to the disturbance to a back end merchandising system. The method further includes retrieving relevant information related to the detected disturbance from the back end merchandising system and displaying the relevant information _____ on a display surface.

17 Claims, 6 Drawing Sheets

(56) References Cited

OTHER PUBLICATIONS

Pinhanez, et al., "Ubiquitous Interactive Displays in a Retail Environment", Siggraph'03 Sketches. San Diego, California. Jul. 2003, 1 page.
Sukaviriya, et al., "Augmenting a Retail Environment Using Steerable Interactive Displays", CHI'03—Short Papers. Fort Lauderdale, Florida. Apr. 2003, 2 pages.
Pingali, et al., "Steerable Interfaces for Pervasive Computing Spaces", IEEE International Conference on Pervasive Computing and Communications—PerCom'03. Dallas-Fort Worth, Texas. Mar. 2003, 8 pages.
Pingali, et al., "User-Following Displays", IEEE International Conference on Multimedia and Expo 2002 (ICME'02). Lausanne, Switzerland. 2002, 4 pages.
Notice of Allowance dated Oct. 18, 2012 in U.S. Appl. No. 11/695,938, 9 pages.
Spassova, L., Wasinger, R., Baus, J., Kruger, A: Product associated displays in a shopping scenario. In: ISMAR 2005, pp. 210-211. IEEE Computer Society Press, Washington, DC, USA (2005), retrieved on Mar. 30, 2009 from <http://ieeexplore.ieee.org/stamp/stamp.jsp?arnumber=01544698>.
Sukaviriya, N., Podlaseck, M., Kjeldsen, R., Levas, A., Pingali, C.: Augmenting a retail environment using steerable interactive displays. In: CHI 2003, pp. 978-979. A CM Press, New York (2003), Retrieved on Mar. 30, 2009 from <http://portal.amc.org/citation.cfm?doid=765891.766104>.
Pinhanez C. "The everywhere Displays Projector: A Device to Create Ubiquitous Graphical Interfaces". In Proc. of the 3rd International Conference on Ubiquitous Computing (Ubicomp 2001), Atlanta, GA, Retrieved Mar. 31, 2009 from <http://www.springerlink.com/content/4t532ky5q7tmvj9y/fulltext.pdf>.

* cited by examiner

SYSTEM AND METHOD FOR INTERACTIVE MARKETING TO CONSUMERS

CROSS-REFERENCE TO RELATED APPLICATIONS

The present application is a continuation application to U.S. application Ser. No. 11/695,938, filed on Apr. 3, 2007, the contents of which are herein incorporated by reference in its entirety.

FIELD OF THE INVENTION

The invention generally relates to a system and method for interactive marketing to consumers and, more particularly, to a system and method for marketing merchandise to consumers in an interactive retail environment.

BACKGROUND OF THE INVENTION

Marketing of merchandise is ubiquitous in today's retailing environment. Typically, marketing of merchandise may take many forms ranging from print advertising to television advertisements to mass mailings, etc. By way of example, print ads may take the form of direct mailings, newspapers, magazines, journals, press releases, posters, billboards, etc.

Additionally, in the retail environment, it has become common to advertise in the store, itself, by way of signs, posters and other print media. In recent years, though, with the advent of new technologies, it has become common for retail stores to display merchandise to the consumer directly on a static display. In this manner, retail companies have been leveraging information technology (IT) to market and sell to consumers.

A significant problem with the way that these technologies are currently being explored is that they tend to be passive and rely on consumer motivation. Also, these technologies do not provide a useful experience for the consumer. For example, current uses of IT to market to consumers in retail settings are noticeably passive in nature. Examples such as plasma/LCD displays push advertisements for kiosks which provide merchandise directories or limited guided selling tools in stores. Also, such technologies operate in fixed locations and rely entirely upon the consumer to actively engage them, while providing limited incentive for engagement. In a retail environment, such passivity makes little sense from a return-on-investment perspective.

Accordingly, there exists a need in the art to overcome the deficiencies and limitations described hereinabove.

SUMMARY OF THE INVENTION

In a first aspect of the invention, a method comprises detecting a disturbance in an area and sending information related to the disturbance to a back end merchandising system. The method further includes retrieving relevant information related to the detected disturbance from the back end merchandising system and displaying the relevant information on a display surface.

In another aspect of the invention, the method comprises providing a computer infrastructure being operable to: detect a merchandise in an area; send information related to the merchandise to a back end merchandising system; retrieve information related to the merchandise from the back end merchandising system; and display the information on a display surface.

In yet another aspect of the invention, a system comprising a server has a database containing data associated with merchandise and/or a consumer. A hardware and/or software component provides information to the consumer based on detected merchandise and/or consumer identification.

In another aspect of the invention a computer program product comprising a computer usable medium having readable program code embodied in the medium is provided. The computer program product includes at least one component to: detect a merchandise in an area; send information related to the merchandise to a back end merchandising system; retrieve information related to the merchandise from the back end merchandising system; and display the information on a display surface including recommendations. The display surface is configured to provide interactivity with the consumer including selection of merchandise.

DETAILED DESCRIPTION OF EMBODIMENTS OF THE INVENTION

Figure 1:
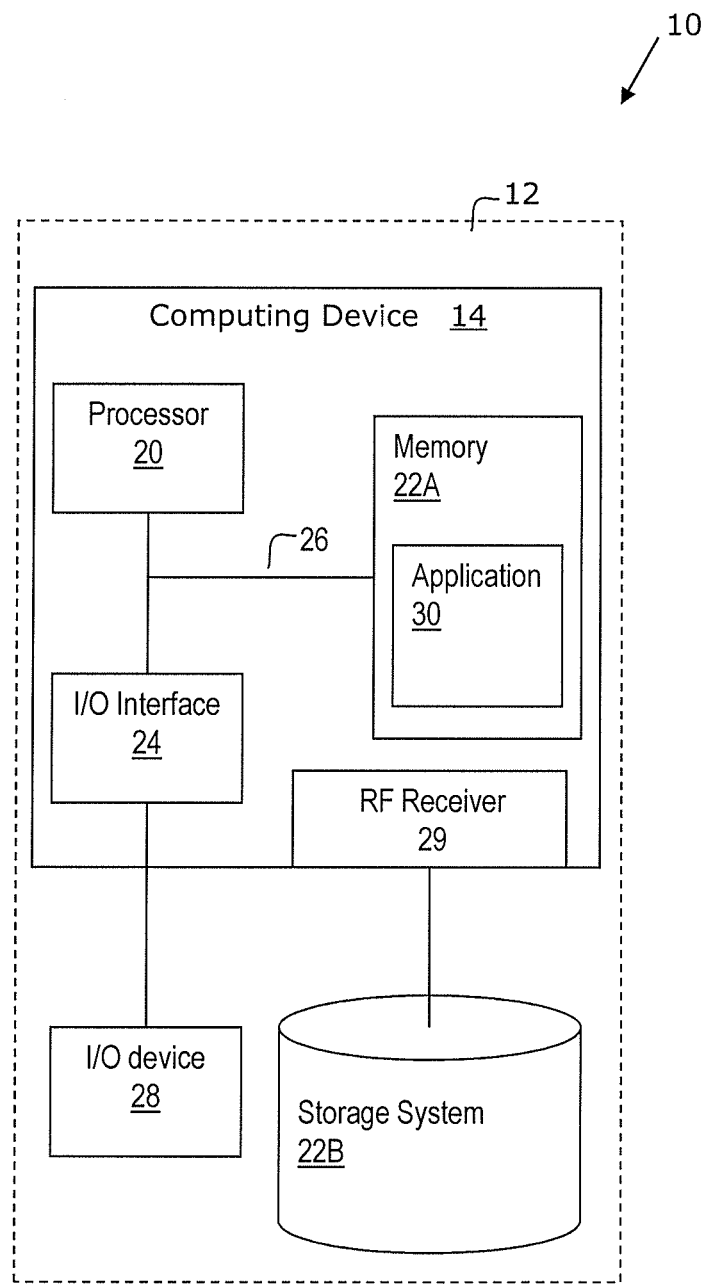
FIG. 1 shows an illustrative environment for implementing the steps in accordance with the invention.

The invention generally relates to a system and method for interactive marketing to consumers and, more particularly, to a system and method for marketing merchandise to consumers in an interactive retail environment. In embodiments, the system and method uses, in combination with known radio frequency (RF) technologies, an interactive display configured to be projected onto any surface, delivering a useful, proactive consumer experience for marketing directly to consumers in a retail environment. The system and method can be implemented using a single computer, over any distributed network or stand-alone server, for example. In embodiments, the system is configured to be directly integrated into preexisting back end inventory management systems.

In contrast to the current marketing technologies, in embodiments, the system and method of the invention utilizes spaces in which consumers are not meant to focus on merchandise (products) per se. For example, in implementation, the system and method of the invention may be implemented in changing rooms, cashier lines and interstitial spaces to operate as the point of engagement. Thus, the invention uses such spaces in stores that are not traditionally associated with marketing to consumers. This approach does not detract from the merchandise, nor will it distract the consumer in a purchasing area. Also, the approach of the invention does not attempt to substitute a virtual experience of a given merchandise for an actual experience. Instead, the approach of the invention takes advantage of ubiquitous computing devices to drive up-sell and cross-sell opportunities in spaces that are generally sales neutral.

In embodiments, the system and method is implemented using, for example, the Everywhere Display™, manufactured and sold by International Business Machines Corp., in combination with RFID technologies. (Everywhere Display™ and IBM are trademarks of IBM Corp. in the United States, other countries, or both.) By way of example, the Everywhere Display can provide computer access in public spaces, facilitate navigation in retail environments, bring computational resources to different areas of the retail environment, and facilitate the marketing of consumer goods through an interactive displaying environment.

In operation, unlike in a passive display, the system and method of the invention utilizes a projection system that has a pan/tilt mirror to deflect light from a projector on to various surfaces and locations in a given environment. Simultaneously, a pan/tilt/zoom camera can detect consumer interaction with the projected interface. Thus, unlike a kiosk or passive display device, the system and method of the invention is not dependent upon location and may be activated by interaction from the consumer (e.g., when a consumer passes into detection range). Also, the ubiquitous display of user interfaces throughout the retail environment allows consumer interaction and proactive marketing to consumers to take place anywhere in the retail environment, rather than in a fixed location, such as a kiosk. This, in conjunction with known RFID and wireless technologies, provides a proactive consumer experience for marketing directly to consumers in the retail environment.

System Environment

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to provide an interactive retailing environment. The computing device 14 includes a processor 20, a memory 22A, an input/output (I/O) interface 24, and a bus 26. Further, the computing device 14 is in communication with an external I/O device/resource 28 and a storage system 22B. The system further includes a radio frequency (RF) receiver 29 which is configured to receive RF signals from, for example, RF identification (ID) tags attached to consumer goods. For example, the RFID can include merchandise information such as size, color, manufacturer, or other features of interest.

The processor 20 executes computer program code, which is stored in memory 22A and/or storage system 22B. While executing computer program code, the processor 20 can read and/or write data from look-up tables which are the basis for the execution of the commands to be performed on the computer, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link. For example, the I/O device may be an interactive surface or display, implemented by the Everywhere Display™.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. These computing devices can be positioned at various locations throughout a retail environment, providing the ability to interact with the consumer throughout such retail environment. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the process steps of the invention on a subscription, advertising, and/or fee basis. That is, a service provider, such as a Solution Integrator, could offer to perform the processes described herein. In this case, the service provider can create, deploy, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
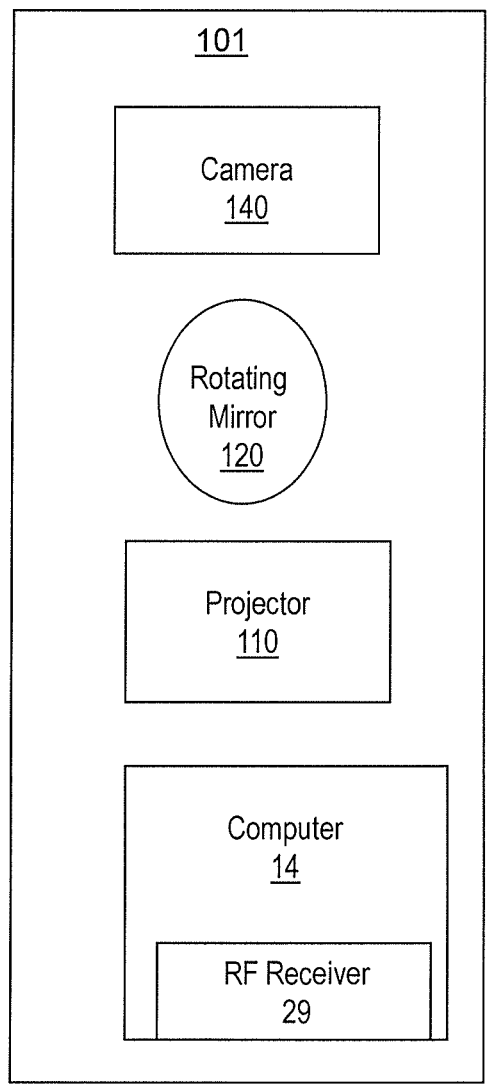
FIG. 2 shows an embodiment of a system in accordance with the invention.

FIG. 2 shows an embodiment of the system of the invention. As shown in FIG. 2, the system is generally depicted as reference numeral 101 and comprises a projector 110 (e.g., LCD projector) and a computer-controlled pan/tilt mirror 120. The projector 110 is connected to the display output of the computing device 14, which also controls the mirror 120. In one non-limiting illustrative example, the light of the projector 110 can be directed in any direction within the range of approximately 60 degrees in the vertical axis and 230 degrees in the horizontal axis. Those of skill in the art should understand that other ranges are contemplated by the invention such as, for example, a range of 360 degrees in the horizontal and/or vertical axis. In embodiments, using the above ranges, the system 101 is capable of projecting a graphical display on most parts of all walls and almost all of the floor or other areas of a retailing environment. In embodiments, the projector 110 is a 1200 lumens LCD projector.

Still referring to FIG. 2, a camera 140 is connected to the computing device 14 and is configured to capture gestures or motions of the consumer and provide such gestures or motions to the computing device 14 for reconciliation and execution of commands (as discussed in greater detail below). As should be recognized, the computing device 14 may be the computing device as shown in FIG. 1. The computing device 14 may also communicate with existing back-end merchandising systems of the retail environment, as discussed below.

The camera 140 is preferably a CCD based camera which is configured and located to capture motions and the like of the consumer. The gestures or motions may be representative of commands provided by the consumer. These commands may include, for example, requests for merchandise, assistance by a sales associate, input of personal or login information, etc. The camera 140 and other devices may be connected to the computing device via any known networking system as discussed above. Further, the system includes a radio frequency (RF) receiver 29 which is configured to receive RF signals from, for example, RF identification (ID) tags attached to merchandise. The RFID can include merchandise information such as size, color, manufacturer, or other features of interest. The RFID tag can also be used to monitor and track the consumer throughout the retail environment, via the RF signals.

In embodiments, the system and method of the invention may recognize the consumer by for example, login information, facial recognition or other identification method (e.g., retina scan, etc.). In addition, the system may track movement of the consumer via the RFID information on any merchandise held by the consumer. This information may be used in order to customize the interactive marketing to the consumer by, for example, providing recommendations to the consumer (i) related to the interests of the consumers, (ii) based on past purchases, (iii) current purchase of merchandise, etc. In this manner, the retailing environment is configured to directly market merchandise to individual consumers. Also, by using such a proactive marketing approach, the consumer can be a passive participant, while still obtaining pertinent merchandise information which is of interest to the specific consumer. This can be used to envelop the consumer in an ambient computing environment.

Figure 3:
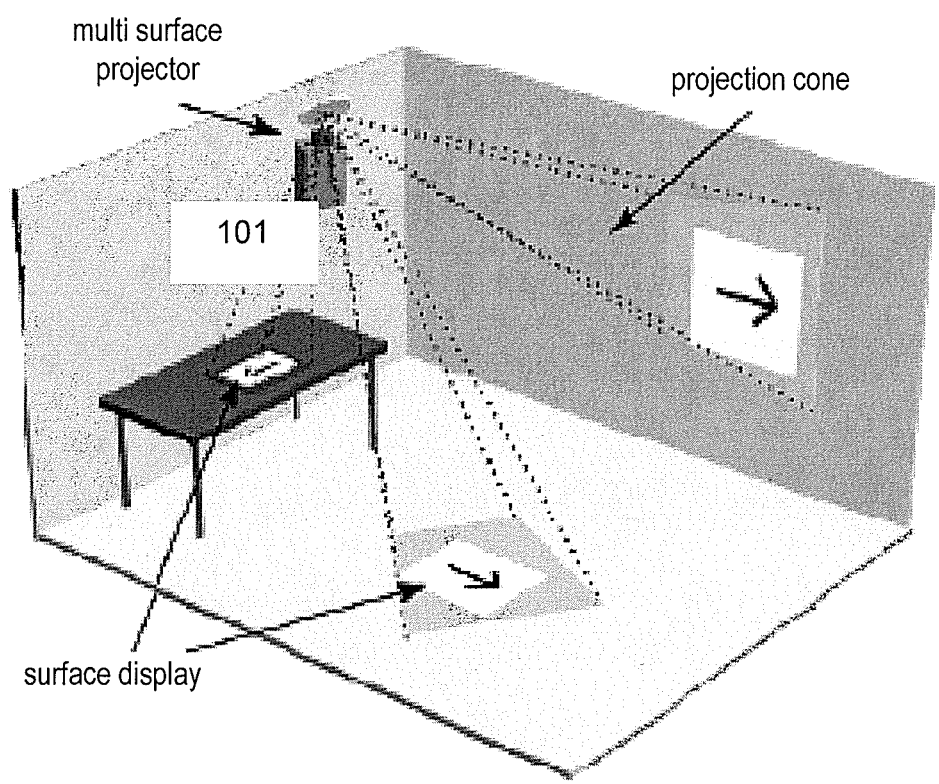
FIG. 3 is a representation of a range of motion of the system in a representative environment in accordance with an embodiment of the invention.

FIG. 3 is a representation of a range of motion of the system in a representative environment according to an embodiment of the invention. As shown in FIG. 3, the system 101 of the invention is configured to project a graphical display on walls, the floor, and a table, for example. The graphical display may be merchandise information, recommendations to purchase certain merchandise, directions to certain locations within the retail environment or to certain merchandise, etc. Of course, depending on the range of the projector, the system 101 is capable of projecting images on most any surface within an environment thus transforming most any surface into an interactive display.

Embodiments of Everywhere Display Architecture

Figure 4:
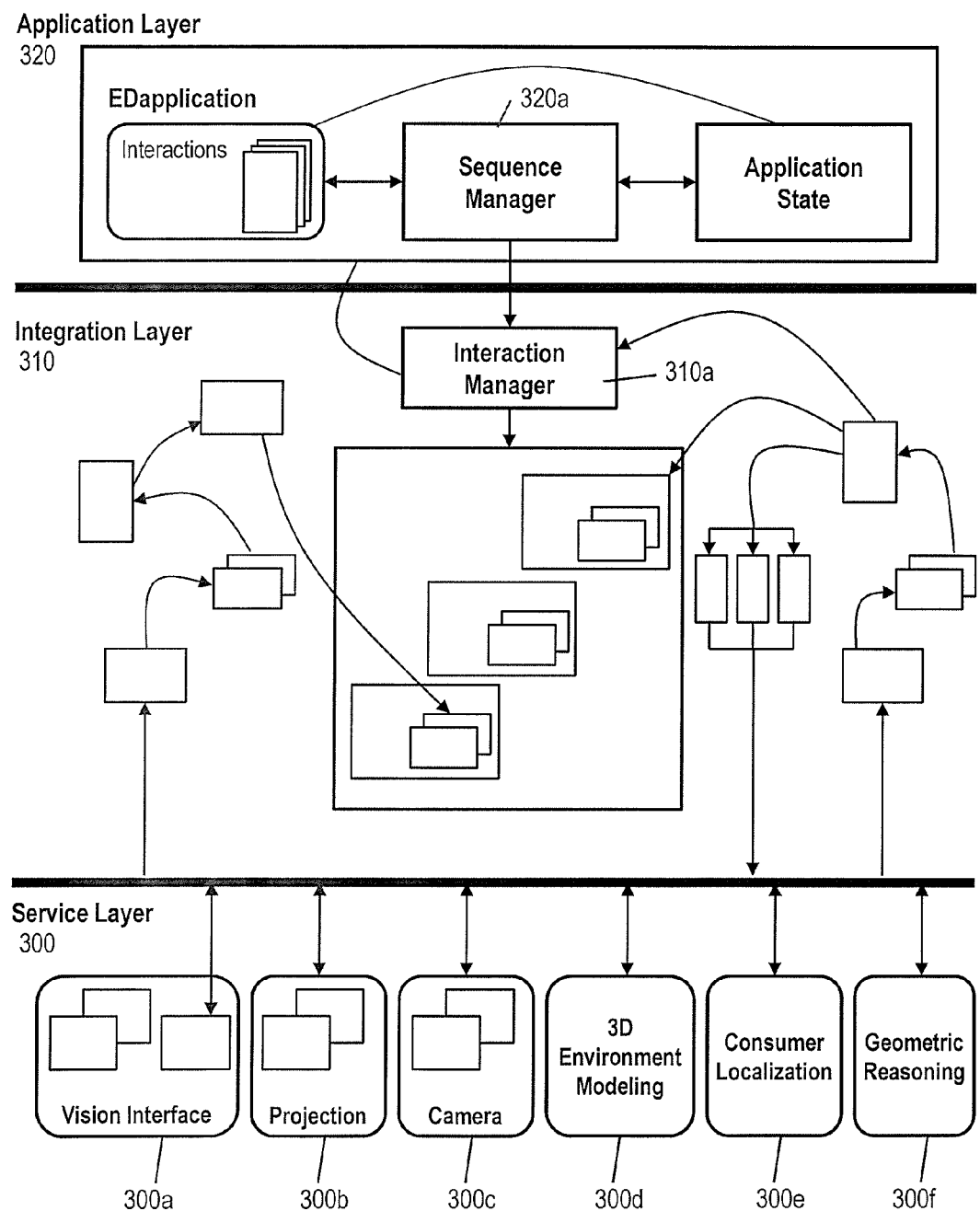
FIG. 4 shows a system architecture according to an embodiment of the invention.

FIG. 4 shows a current system architecture according to an embodiment of the invention. In embodiments, the system architecture includes a three-tier architecture comprising a services layer 300, an integration layer 310 and an application layer 320. In embodiments, each of the modules 300a-300f in the services layer 300 exposes a set of capabilities through a http/XML application programming interface (API). In embodiments, modules in the services layer 300 have no "direct" knowledge or dependence on other modules in the layer; however, the modules 300a-300f may share a common XML language along with a dialect for communication with each module in the services layer 300.

In embodiments, the services layer 300 includes six modules 300a-300f. For example, a vision interface module (vi) 300a may be responsible for recognizing gestures and converting this information to the application (e.g., program being manipulated by the gestures). A projection module (pj) 300b may handle the display of visual information (via the projector) on a specified surface while a camera module (sc) 300c provides the video input (via the camera) from the surface of interest to the vision interface (vi) 300a. The camera, as discussed above, will send the gestures and other motions of the consumer. Interaction with the interface by the consumer comprises orchestrating the vision interface 300a, projection module 300b and camera module 300c through a sequence of synchronous and asynchronous commands, which are capable of being implemented by those of skill in the art. Other modules present in the services layer 300 include a 3D environment modeling module 300d, a consumer localization module 300e, and a geometric reasoning module 300f.

The 3D environment modeling module 300d can be a version of standard 3D modeling software. The 3D environment modeling module 300d can support basic geometric objects built out of planar surfaces and cubes and allows importing of more complex models. In embodiments, the 3D environment modeling module 300d stores the model in XML format, with objects as tags and annotations as attributes. The 3D environment modeling module 300d is also designed to be accessible to the geometric reasoning module 300f, as discussed below.

The geometric reasoning module 300f is a geometric reasoning engine that operates on a model created by a modeling toolkit which, in embodiments, is a version of standard 3D modeling software. The geometric reasoning module 300f enables automatic selection of the appropriate display and interaction zones (hotspots) based on criteria such as proximity of the zone to the consumer and non-occlusion of the zone by the consumer or by other objects. In this manner, gestures can be used to manipulate and execute program commands and/or actions. Applications or other modules can query the geometric reasoning module 300F through a defined XML interface.

In embodiments, the geometric reasoning module 300f receives a consumer position and a set of criteria, specified as desired ranges of display zone properties, and returns all display zones which satisfy the specified criteria. The geometric reasoning module 300f may also have a look-up table or access thereto for determining gestures of a consumer, which may be used to implement the actions or commands associated with a certain application. The properties for a display zone may include, amongst other properties, the following:

1) Physical size of the display zone in some specified units such as inches or centimeters.
2) Absolute orientation defined as the angle between the surface normal of the display zone and a horizontal plane.
3) User proximity defined as the distance between the center of the consumer's head and the center of a display zone.
4) Position of the consumer relative to the display zone, defined as the two angles to the consumer's head in a local spherical coordinate system attached to the display zone. This indicates, for example, whether the consumer is to the left or to the right of a display zone.
5) Position of the display zone relative to the consumer, defined as the two angles to the display zone in a local spherical coordinate system attached to the consumer's head.
6) Occlusion percentage, which is defined as the percentage of the total area of the display zone that is occluded with respect to a specified projector position and orientation.

7) An occlusion mask, which is a bitmap that indicates the parts of a display zone occluded by other objects in the model or by the consumer.

The consumer localization module 300e is, in embodiments, a real-time camera-based tracking to determine the position of the consumer in the environment, as well as, in embodiments, gestures of the consumer. In embodiments, the consumer localization module 300e can be configured to track the consumer's motion to, for example, move the display to the consumer or, in further embodiments, recognize gestures of the consumer for implementing actions or commands.

In embodiments, the tracking technique is based on motion, shape, and/or flesh-tone cues. In embodiments, a differencing operation on consecutive frames of the incoming video can be performed. A morphological closing operation then removes noise and fills up small gaps in the detected motion regions. A standard contour-tracing algorithm then yields the bounding contours of the segmented regions. The contours are smoothed and the orientation and curvature along the contour is computed. The shape is analyze for each contour to check if it could be a head or other body part or object of interest, which is tracked by the system and method of the invention.

In the example of a head, the system looks for curvature changes corresponding to a head-neck silhouette (e.g., concavities at the neck points and convexity at the top of the head). In embodiments, sufficient flesh-tone color within the detected head region is detected by matching the color of each pixel within the head contour with a model of flesh tone colors in normalized red-green (RG) space. This technique detects multiple heads in real time. In embodiments, multiple cameras with overlapping views to triangulate and estimate the 3D position of the consumer are possible. This same technique can be used to recognize gestures in order for the consumer to interact with the display.

In embodiments, the integration layer 310 provides a set of classes that enable a JAVA application to interact with the services. (Java and all Java-based trademarks are trademarks of Sun Microsystems, Inc. in the United States, other countries, or both.) The integration layer 310, in embodiments, contains a set of JAVA wrapper objects for all objects and commands, along with classes enabling synchronous and asynchronous communication with modules in the services layer 300. The integration layer 310, in embodiments, mediates the interaction among the services layer modules 300a-300f. For example, through a single instruction to the interaction manager 310a, a JAVA application can start an interaction that sends commands to the vision interface, the projection module and the mirror defining, instantiating, activating, and managing a complex interactive display interaction. Similarly, the integration layer 310, for example, can coordinate the geometric reasoning module and the 3D environment modeler in a manner that returns the current consumer position along with all occluded surfaces to the application at a specified interval.

In embodiments, the application layer 320 comprises a set of classes and tools for defining and running JAVA applications and a repository of reusable interactions. In embodiments, each interaction is a reusable class that is available to any application. An application class, for example, is a container for composing multiple interactions, maintaining application state during execution, and controlling the sequence of interactions through the help of a sequence manager 320a. Other tools may also be implemented such as, for example, a calibrator tool that allows a developer to calibrate the vision interface module 300a, the projection module 300b and the camera module 300c for a particular application.

In embodiments, the consumer interacts with the projected display by using hand gestures over the projected surface, as if the hands, for example, were a computer mouse. Techniques described above, such as, for example, using the geometric reasoning module 300f or the consumer localization module 300e can be implemented to recognize such gesturing. By way of non-limiting illustration, the geometric reasoning module 300f may use an occlusion mask, which indicates the parts of a display zone occluded by objects such as, for example, hand gestures of the consumer.

More specifically, in embodiments, the camera may perform three basic steps: (i) detecting when the consumer is pointing; (ii) tracking where the consumer is pointing; and (iii) detecting salient events such as a button touch from the pointing trajectory and gestures of the consumer. This may be performed, for example, by detecting an occlusion of the projected image over a certain zone, such as, for example, an icon or pull down menu. This information is then provided to the computer, which then reconciles such gesture with a look-up table, for example.

Methods of Implementing Embodiments of the Invention

Figure 5:
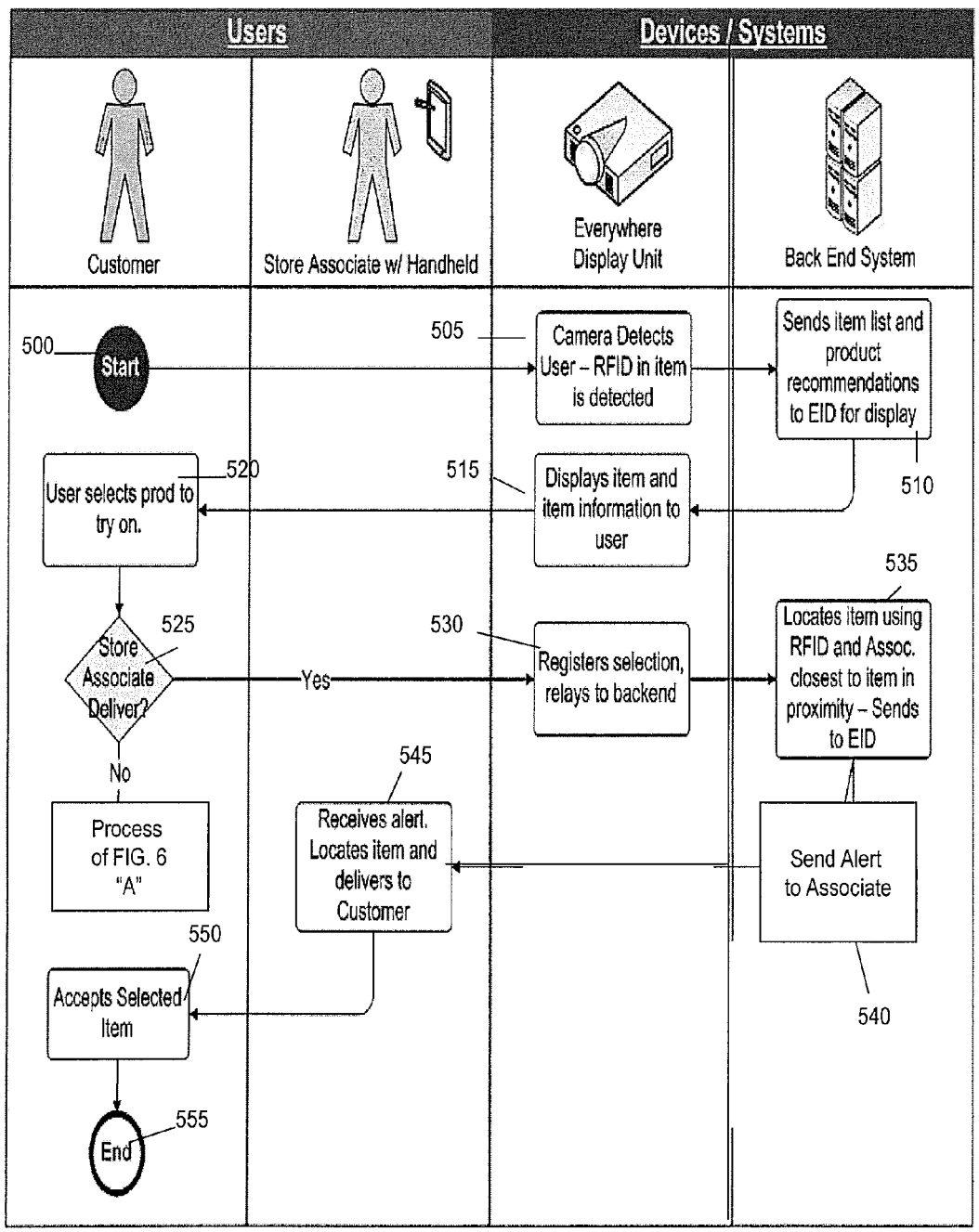
FIG. 5 is a representation of a swim lane diagram implementing steps according to an embodiment of the invention.
Figure 6:
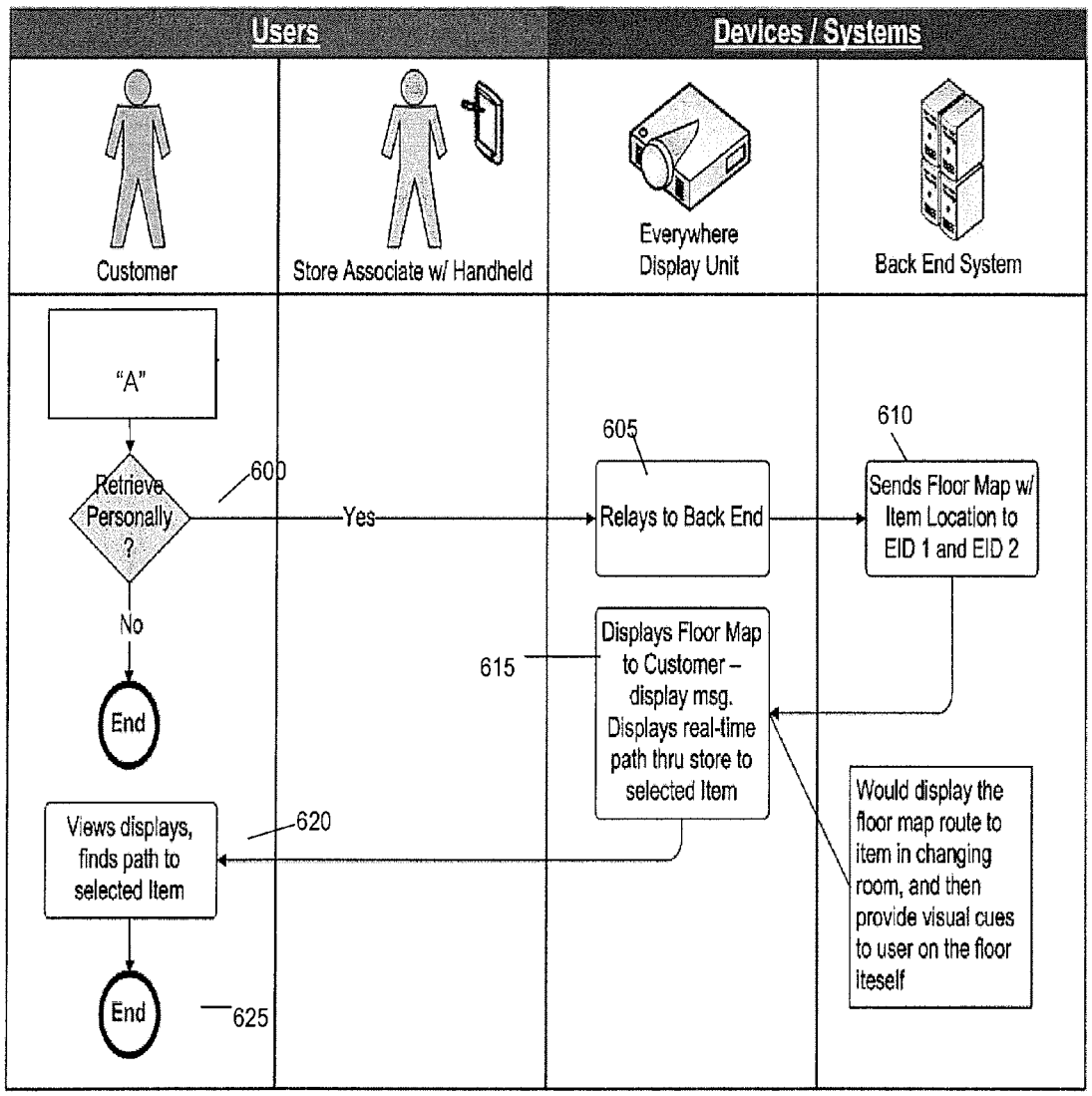
FIG. 6 is a representation of a swim lane diagram implementing steps according to an embodiment of the invention.

FIGS. 5 and 6 are swim lane diagrams showing steps of embodiments of the invention. "Swim lane" diagrams may be used to show the relationship between the various "components" or "players" in the processes and to define the steps involved in the processes. FIGS. 5 and 6 may equally represent a high-level block diagram of components of the invention implementing the steps thereof. The steps of FIGS. 5 and 6 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIGS. 5 and 6 may also be implemented by the embodiment of FIG. 1.

In particular, FIG. 5 shows a process flow diagram, describing a scenario in which a consumer interacts with the system of the invention. The swim diagram of FIG. 5 includes four swim lanes 100, 200, 301, 400. In particular, swim lane 100 shows consumer actions, swim lane 200 shows actions performed by a sales associate, swim lane 301 shows actions performed by the interactive system, e.g., Everywhere Display, and swim lane 400 shows actions related to a back end system integrated with the components described herein. The back end system can be any database and associated computing system which includes merchandise information. The back end system also includes the capabilities to interact with the interactive system and/or the sales associate, via a handheld, wireless computing device. As should be understood, the back end system uses metadata to make recommendations to consumers in addition to size and stocking information.

At step 500, the process begins. Step 500 may include, for example, the consumer entering a changing room or other area of the retailing environment. At step 505, the camera of the interactive system detects the consumer. At this step, the system may also detect any merchandise which the consumer may have selected for purchase, or otherwise has some interest, etc. This may be accomplished via an RFID on the merchandise, which transmits a signal to the RF receiver of the system. The RFID (and any pertinent consumer information) is sent to the back end system. In embodiments, the system of the invention can also track consumer movement throughout the retail environment, via the RFID on merchandise. In this manner, the system and method of the invention may provide messages to the consumer about certain merchandise in the retail environment which is in close proximity to the consumer, and which may be of interest to the consumer based on the merchandise currently being held by the consumer.

The back end system may be any existing inventory tracking system with the capability of communicating with the interactive system, as well as a sales associate via a wireless, handheld device. In embodiments, the back end system includes a database of merchandise information, which may include cross-referencing information between merchandise, product lines, etc. for future recommendation to the consumer. The back end system may also include consumer information, which is imported into the back end system. The consumer information may be provided by the consumer, via surveys or other information gathering method. The consumer information may include, for example, clothing size, color preferences, merchandise type preferences (brand names, etc.), economic status, to a host of other information related to the tastes and preferences of the consumer. This information may be cross referenced to merchandise information for providing recommendations to the consumer.

At step 510, the back end system sends information to the interactive system to display to the consumer. In embodiments, the consumer may interact with the display, opting to select certain selections which, in turn, are provided to the back end system. Information may include product information, recommendations for purchase, etc. Product information may include for example, available sizes; available colors; number in stock; and/or recommendations of other products, etc. Selections provided by the consumer, similarly, may include size, color, or other merchandise provided as a recommendation by the back end system.

At step 515, the device displays the retrieved information to the consumer. At step 520, the consumer may interact with the display, opting to select a new product based upon the provided information. At step 525, the consumer may choose to have a store associate deliver the item directly to them or retrieve it themselves. If the consumer opts to retrieve the merchandise, the process continues with the flow of FIG. 6. If the consumer opts to have a store associate deliver selected item, then the flow continues at step 530.

At step 530, the interactive device registers the selection and relays it to the backend. At step 535, the selected merchandise is located via RFID. The process sends an alert to a wireless handheld device of the store associate closest in proximity to the merchandise, at step 540. The system may determine closest proximity using many methods such as, for example, GPS technology. The information presented to the store associate may include the location of the merchandise on a floor-map and location of the consumer. At step 545, the store associate receives the alert and retrieves the merchandise using, for example, the floor-map received from the back end system. At step 550, the consumer accepts the merchandise from the store associate. The process ends at step 555.

FIG. 6 shows an additional process flow diagram, describing a scenario in which a consumer interacts with the system of the invention. Similar to FIG. 5, the swim diagram of FIG. 6 includes four swim lanes 100, 200, 301, 400. In particular, swim lane 100 shows consumer actions, swim lane 200 shows actions performed by a sales associate, swim lane 301 shows actions performed by the interactive system, e.g., Everywhere Display, and swim lane 400 shows actions related to a back end system.

At step 600, the consumer makes a determination to personally retrieve the merchandise. This interaction may be performed by a gesture such as, for example, a motion which is indicative of a button depression displayed on the interactive display surface. If the consumer decides not to personally retrieve the merchandise, the process will continue with step 530 of FIG. 5.

If the consumer decides to personally retrieve the merchandise, the process continues to step 605. At step 605, the system of the invention will relay the information to the back end system. At step 610, the back end system will determine the location of the merchandise of interest and send a floor map with the location of the merchandise to the consumer. At step 615, a floor map will be displayed to the consumer, which will include the location of the merchandise of interest. In embodiments, the floor map may be displayed at several locations throughout the retail environment, providing the consumer with the route to the merchandise of interest. At step 620, the consumer views the floor map. At step 625, the process ends.

While the invention has been described in terms of embodiments, those skilled in the art will recognize that the invention can be practiced with modifications and in the spirit and scope of the appended claims.

What is claimed is:

1. A method, comprising:
   detecting by a camera a presence of a consumer in a retail environment;
   determining an item of interest to the consumer in the retail environment using information of the consumer stored in a memory device;
   determining a location of the item of interest using a database containing information of merchandise in the retail environment;
   displaying a floor map with the location of the item of interest to the consumer; and
   tracking movement of the consumer in the retail environment.

2. The method of claim 1, wherein the determining the item of interest comprises:
   providing a message to the consumer based on the information of the consumer; and
   receiving a selection from the consumer.

3. The method of claim 1, wherein the determining the item of interest comprises detecting merchandise selected by the consumer using an RF identification (RFID) on the merchandise selected by consumer.

4. The method of claim 3, wherein the tracking movement of the consumer in the retail environment comprises tracking a RF signal from the RFID.

5. The method of claim 4, further comprising providing messages to the consumer about other merchandise in the retail environment which is in close proximity to the consumer based on the merchandise selected by consumer.

6. The method of claim 1, wherein the displaying the floor map comprises providing the consumer with a route to the item of interest by displaying the floor map at a plurality of locations in the retail environment.

7. A system comprising:
   a server having a database containing information of merchandise in a retail environment;
   one or more cameras;
   one or more projectors;
   one or more radio frequency (RF) receivers; and at least one of a hardware and software component operable to:
- detect a presence of a consumer in the retail environment using the one or more cameras;
- determine an item of interest to the consumer in the retail environment by cross referencing information of the consumer and the information of merchandise in the database;
- determine a location of the item of interest in the retail environment using the one or more RF receivers;
- displaying a floor map with the location of the item of interest to the consumer using the one or more projectors; and
- track movement of the consumer in the retail environment using the one or more RF receivers.

8. The system of claim 7, wherein the one of a hardware and software component is operable to detect merchandise selected by the consumer using an RF identification (RFID) on the merchandise selected by consumer received by the one or more RF receivers.

9. The system of claim 8, wherein the one of a hardware and software component is operable to track movement of the consumer in the retail environment using an RF signal of the RFID on the merchandise selected by the consumer received by the one or more RF receivers.

10. The system of claim 9, wherein the one of a hardware and software component is operable to provide messages to the consumer about other merchandise in the retail environment which is in close proximity to the consumer based on the merchandise selected by consumer using the one or more projectors.

11. The system of claim 7, wherein the one of a hardware and software component is operable to provide the consumer with a route to the item of interest by displaying the floor map at a plurality of locations in the retail environment using the one or more projectors.

12. A computer program product comprising a computer usable storage medium having readable program code embodied in the medium, the computer program product includes at least one component operable to:
- detect a presence of a consumer in a retail environment;
- determine an item of interest to the consumer in the retail environment based on information of the consumer;
- determine a location of the item of interest in the retail environment;
- send a floor map with the location of the item to the consumer; and
- track movement of the consumer in the retail environment.

13. The computer program product of claim 12, wherein the computer program product is operable to provide a message to the consumer based on an identification of the consumer.

14. The computer program product of claim 12, wherein the computer program product is operable to detect merchandise selected by the consumer using an RF identification (RFID) on the merchandise selected by consumer.

15. The computer program product of claim 14, wherein the computer program product is operable to track a RF signal transmitted from the RFID.

16. The computer program product of claim 15, wherein the computer program product is operable to provide messages to the consumer about other merchandise in the retail environment which is in close proximity to the consumer based on the merchandise selected by consumer.

17. The computer program product of claim 12, wherein the computer program product is operable to provide the consumer with a route to the item of interest by displaying the floor map at a plurality of locations in the retail environment.

* * * * *